United States Patent [19]

Deville

[11] Patent Number: 5,161,371
[45] Date of Patent: Nov. 10, 1992

[54] EXHAUST OUTLET WITH CLEANER

[75] Inventor: Paul Deville, Ayze, France

[73] Assignee: Devil, société anonyme, Marignier, France

[21] Appl. No.: 625,438

[22] Filed: Dec. 11, 1990

[30] Foreign Application Priority Data

Dec. 20, 1989 [FR] France ................. 89 17205

[51] Int. Cl.⁵ ............................................. F01N 3/02
[52] U.S. Cl. ................................. 60/309; 55/319; 55/466
[58] Field of Search ............... 60/309, 316, 317, 319, 60/324; 181/227, 262, 263; 55/319, 466; 138/44

[56] References Cited

U.S. PATENT DOCUMENTS

| | | | |
|---|---|---|---|
| 3,374,857 | 3/1968 | Hutchins | 181/227 |
| 3,421,315 | 1/1969 | Aoi | 55/466 |
| 3,932,987 | 1/1976 | Munzinger | 60/309 |
| 4,018,580 | 4/1977 | Burkholz | 55/466 |
| 4,690,245 | 9/1987 | Gregorich | . |
| 4,926,638 | 5/1990 | Kakuta | 60/319 |

FOREIGN PATENT DOCUMENTS

| | | |
|---|---|---|
| 606040 | 2/1926 | France . |
| 1052611 | 1/1954 | France . |
| 89/05394 | 6/1989 | PCT Int'l Appl. . |
| 362572 | 7/1962 | Switzerland . |
| 684987 | 12/1952 | United Kingdom . |

Primary Examiner—Douglas Hart
Attorney, Agent, or Firm—William H. Eilberg

[57] ABSTRACT

An exhaust outlet is disclosed, characterized by the presence of an intermediate expansion chamber (4) situated between a collector tube (3) and an outlet tube (5). The intermediate expansion chamber (4) comprises a first portion (6) with divergent walls and a second portion (7) with convergent walls. A discharge orifice (9) is formed in the central zone (8) of the expansion chamber. The expansion chamber (4) captures the particles brought by the gases and discharges them through the discharge orifice (9).

13 Claims, 2 Drawing Sheets

EXHAUST OUTLET WITH CLEANER

BACKGROUND OF THE INVENTION

1. Field of the Invention

The present invention relates to exhaust outlets forming the end zone of an internal combustion engine exhaust gas line.

Exhaust outlets are generally intended to be connected to the outlet of an exhaust gas conduction duct, for example the outlet of the silencer, and they comprise an inlet orifice with means for connection to the exhaust gas conduction duct and an outlet orifice open to the free air for discharge of the gases, and means for conducting the gases from the inlet orifice to the outlet orifice.

In their simplest form, exhaust outlets are formed by a simple tube.

2. Description of the Prior Art

An older but more elaborate form of exhaust outlet is described in the document FR-A-606 040. It comprises a pipe with several successive bell-mouth portions surrounded by an outer casing. Each bell-mouth portion is pierced in its upper part to allow the exhaust gases to pass through the gap between the pipe and the outer casing. In this gap, the gases follow a spiral movement and leave through lower openings in the casing, directed towards the ground. The exhaust noise is attenuated, condensates form in the gap between the pipe and the casing and are discharged through the lower openings with the gases.

Exhaust outlets are subjected to chemical and physical stresses and aggressions such as the ambient humidity, the heat of the exhaust gases, the liquid or solid particles carried along by the exhaust gases. The result is a risk of fairly rapid corrosion of the exhaust outlets. This risk is all the greater in the case of a structure such as described in the document FR-A-606 040, for the corrosion develops in the vicinity of each lower opening and in the gap through which the gases flow.

Attempts have been made to reduce such corrosion by providing exhaust outlets made from an anti-corrosion material such as stainless steel. An exhaust outlet made from such material, when it is new, has a bright pleasant appearance to the eye. However, during use, the appearance is rapidly impaired because particles brought by the exhaust gases are deposited on the exhaust outlet in the vicinity of its outlet orifice. Furthermore, the condensation liquids which form inevitably in the exhaust outlet tend to drip towards the outside through the outlet orifice and accentuate the external cleanliness defects of the exhaust outlet.

SUMMARY OF THE INVENTION

The object of the present invention is to overcome the drawbacks of known structures of exhaust outlets by proposing a new structure which very substantially reduces the deposits of solid particles in the vicinity of the outlet orifice. The invention further makes it possible to prevent the liquid particles brought by the exhaust gases from dripping through the outlet orifice.

A particular embodiment of the present invention allows the above effect to be obtained while keeping the internal aeraulic qualities of the exhaust outlet, i.e. without disturbing the power developed by the internal combustion engine to which the exhaust outlet is connected.

Another advantage of the invention is to slightly modify the sonority of the exhaust outlet, by producing a slightly deeper sound through elimination of certain high frequency components.

In a particular embodiment, the invention further makes it possible to reduce the backlash noise of the exhaust outlet, which noise occurs when the gas feed to the internal combustion engine to which the exhaust outlet is connected is reduced.

To attain these objects as well as others, the exhaust outlet according to the invention comprises:

a collector tube conducting the exhaust gases from the inlet orifice to an intermediate expansion chamber, an outlet tube conducting the exhaust gases from the intermediate expansion chamber to the outlet orifice, said intermediate expansion chamber comprising a first portion with divergent walls adjacent the junction with the collector tube, connected by a central zone to a second portion with convergent walls adjacent the junction with the outlet tube, at least one dust and liquid discharge orifice formed in the lower portion of the central zone of the intermediate expansion chamber wall.

Preferably, the collector tube has a smaller cross section than that of the outlet tube and the walls of the first portion of the intermediate expansion chamber are connected to the walls of the second portion by a rounded profile.

The effect of the expansion chamber with a discharge orifice is to capture the solid and liquid particles in suspension which are brought by the exhaust gases, these particles being advantageously discharged through the dust and liquid discharge orifice. Thus, the exhaust outlet keeps its cleanliness to a maximum in the vicinity of the outlet orifice.

In an advantageous embodiment, the outlet tube comprises apertures spaced apart about the periphery of its wall and an air intake is provided for the intake of outside air through the apertures in the direction of the inside of the outlet tube. The air sucked in again through the apertures is re-circulated and dilutes the exhaust gases. Furthermore, this flow of fresh air improves the gas flow and produces a peripheral layer of fresh air, at the level of the outlet orifice, which protects the zone of the outlet orifice with respect to the hot and polluted gases.

In a particular embodiment, the collector tube comprises a narrowed zone in the form of a Venturi, defined by convergent walls with open angle connected to divergent walls with a more reduced angle. This arrangement very substantially reduces the backlash noise.

BRIEF DESCRIPTION OF THE DRAWINGS

Other objects, features and advantages of the present invention will be clear from the following description of particular embodiments, in connection with the accompanying figures in which.

DESCRIPTION OF THE PREFERRED EMBODIMENTS

Figure 1:
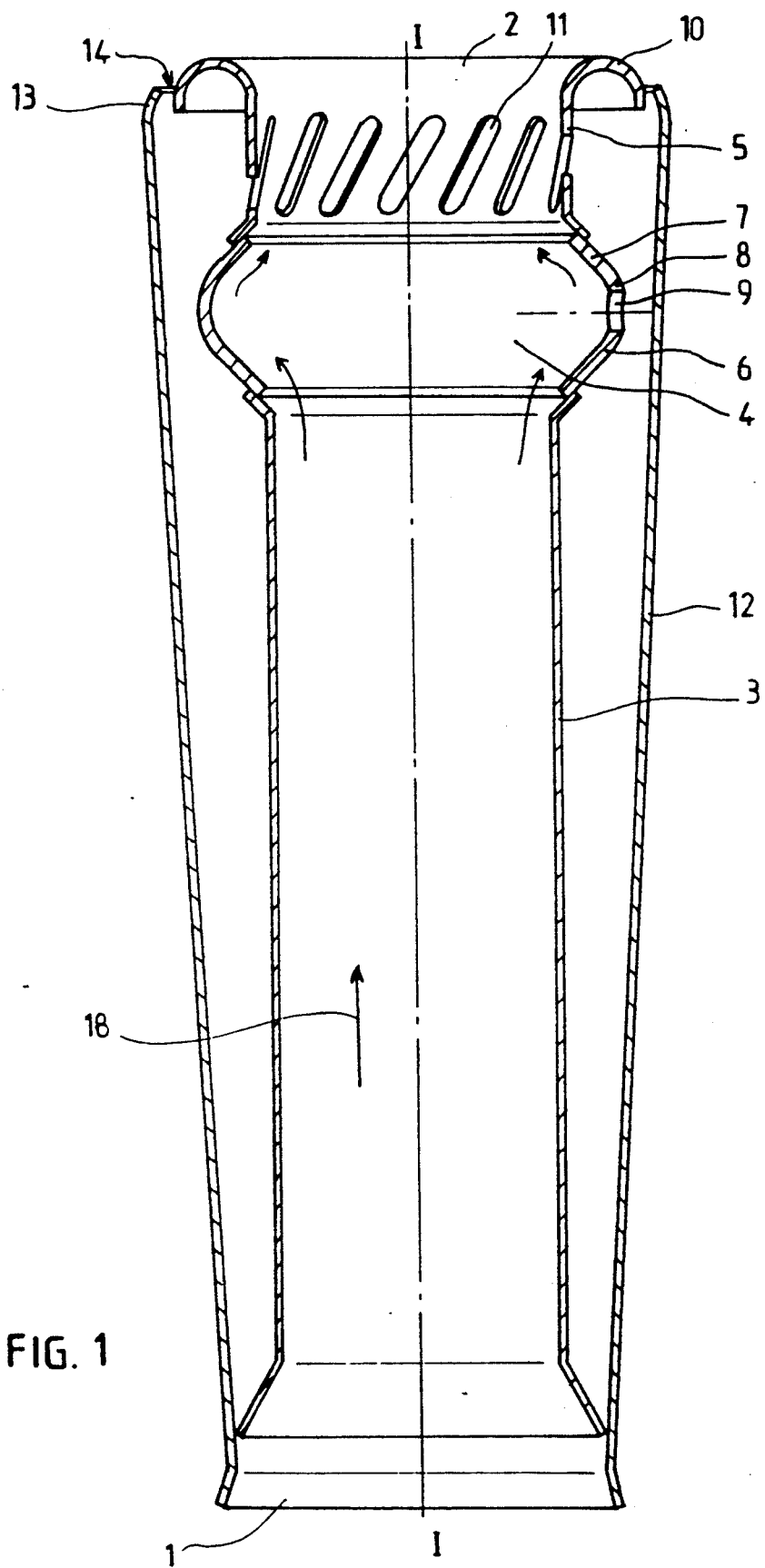
FIG. 1 is a longitudinal section of an exhaust outlet according to a first embodiment of the present invention.

As shown in the figures, the exhaust outlet according to the invention comprises an inlet orifice 1 adapted for connection to an exhaust gas conducting duct not shown in the figures, and an outlet orifice 2 open to the free air for the discharge of the gases. The exhaust outlet leads the gases from the inlet orifice 1 to the outlet orifice 2.

For the convenience of the drawings, this exhaust outlet has been shown along a longitudinal axis I—I in the vertical direction. Naturally, in the position of use, this exhaust outlet is intended to be used preferably in a horizontal position, i.e. with its longitudinal axis I—I disposed horizontally or with a slight slant with respect to the horizontal.

The exhaust outlet comprises a collector tube 3 leading the exhaust gases from the inlet orifice 1 to an intermediate expansion chamber 4. An outlet tube 5 leads the exhaust gases from the intermediate expansion chamber 4 to the outlet orifice 2. The intermediate expansion chamber 4 comprises a first portion 6 with divergent walls in the direction of flow of the exhaust gases, adjacent the junction with the collector tube 3 and comprises a second portion 7 with convergent walls in the direction of flow of the exhaust gases, adjacent the junction with the outlet tube 5.

The divergent walls of the first portion 6 form substantially a cone whose angle at the apex may advantageously be between 70° and 100°, for example close to 90°. The same goes for the convergent walls of the second portion 7 of the expansion chamber.

Good results have been obtained by providing an expansion chamber 4 whose maximum cross section, in the connection zone between the first portion 6 and the second portion 7 is at least 50% larger than the cross section of the collector tube 3.

In the embodiment shown in the figures, the collector tube 3 advantageously has a smaller cross section than that of the outlet tube 5.

The walls of the first portion 6 of the intermediate expansion chamber are advantageously connected to the walls of the second portion 7 along a central wall zone 8 of the intermediate expansion chamber having a rounded profile.

The central zone 8 of the intermediate expansion chamber wall advantageously comprises at least one discharge orifice 9, in its lower part, for discharge of the dust and liquids brought by the exhaust gases into the collector tube 3 and trapped in the expansion chamber 4. By central zone "lower portion" 8 is meant the peripheral central zone portion intended to be oriented downwards when the exhaust outlet is in the position of use with its longitudinal axis I—I substantially horizontal.

The purpose of orifice 9 is not to let the exhaust gases leave laterally. They must leave through the outlet tube 5. Orifice 9 must however permit the liquid or solid condensates to be discharged which appear in the intermediate expansion chamber 4. Good results have been obtained using an orifice 9 whose diameter is between about 6 and 10 mm, preferably about 8 mm for a usual collector tube diameter of about 40 to 50 mm.

The discharge orifice 9 may be centered on the central zone 8, as shown in the figures. However, the discharge orifice 9 may advantageously be slightly offset downstream of the central zone, so that its upstream edge is in the middle of the central zone, in the widest portion of the expansion chamber.

The outlet tube 5 is substantially cylindrical and ends in a rounded flange 10 bent back outwardly. The outlet tube 5 comprises apertures 11 spaced apart about the periphery of its wall, for example oblong apertures slanted with respect to the longitudinal axis I—I.

An outer casing 12 covers the whole of the lateral face of the collector tube 3, of the intermediate expansion chamber 4 and of the outlet tube 5, as shown in the figures. In the zone of the inlet orifice 1, the outer casing 12 is connected to the collector tube 3. On the other hand, in the zone of the outlet orifice 2, the periphery of flange 10 of the outlet tube 5, forming the outlet orifice 2, is non jointing with the end edge 13 of the outer casing 12 defining an annular air intake passage 14.

The lower wall of the outer casing 12 may advantageously be divergent, or slanted downwards, for facilitating discharge of the dust and liquids coming from the intermediate expansion chamber 4 and leaving through the discharge orifice 9.

In the embodiment of FIG. 1, the collector tube 3 is cylindrical.

Figure 2:
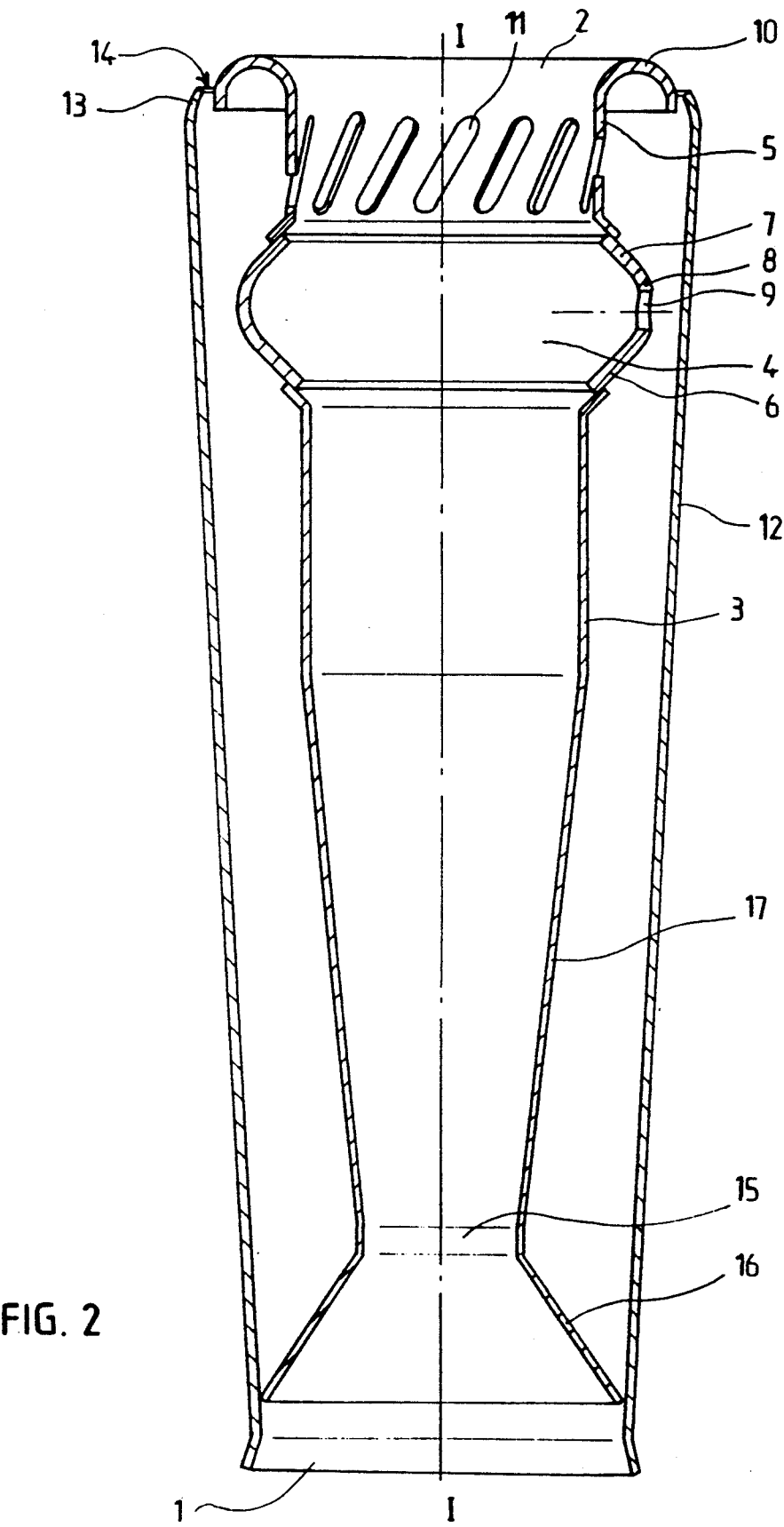
FIG. 2 is a longitudinal section of an exhaust outlet according to a second embodiment of the present invention.

On the other hand, in the embodiment of FIG. 2, the collector tube 3 comprises a narrowed zone 15 in the form of a Venturi, defined by convergent upstream walls 16 with open angle connected to divergent downstream walls 17 with a more reduced angle, as shown in the figures, at the angles usually used for Venturis intended for a gas fluid flow.

In one embodiment, the different tubular parts of the exhaust outlet may be cylindrical or conical of revolution, i.e. have circular cross section.

Alternately, the different tubular portions may have an oval, polygonal or other cross section.

The outer casing 12 may have a cylindrical form or a conical form.

The exhaust outlet according to the invention functions as follows: the exhaust gases introduced through the inlet orifice 1 flow through the collector tube 3, as shown by arrow 18. In the expansion chamber 4, the first portion 6 of the expansion chamber is under a high depression with respect to the rest of the chamber and traps the particles in suspension in the exhaust gases. These particles are deposited in the low part of the expansion chamber 4 and are discharged by gravity through the lower discharge orifice 9.

Because of the reduction of cross section of the outlet tube 5 with respect to the cross section of the expansion chamber 4, the first portion of outlet tube 5 is under a slight depression and air is sucked from the outside through the apertures 11 and the annular air intake passage 14. The air sucked in penetrating through apertures 11 dilutes the exhaust gases. This air flow improves the flow of the gases and results in a peripheral air layer which protects flange 10 from the deposits of solid or liquid particles still in suspension in the exhaust gases. This air flow further improves the aeraulic behavior of the exhaust outlet and prevents the power of the internal combustion engine from being disturbed despite the presence of the expansion chamber 4.

The outer casing 12 protects the collector tube 3, the expansion chamber 4 and the outlet tube 5. Its function is also to create a volume about the central portions of the exhaust outlet, which volume gives a deeper characteristic sound to the exhaust, by eliminating certain high frequency components.

In the embodiment shown in FIG. 2, the purpose of the Venturi type narrowed zone 15 is to substantially reduced the backlash noise, i.e. the noise appearing at the level of the exhaust outlet when the gas feeding the internal combustion engine to which the exhaust is connected is substantially reduced. This effect of substantial reduction of the backlash noise is likely due to the fact that the narrowed zone 15 forms an obstacle for the acoustic waves coming from the outlet orifice 2 and propagating towards the inlet orifice 1 and also forms an obstacle for the acoustic waves coming from the exhaust duct and being directed towards the inlet orifice 1. Everything happens as if the volume of the gas column situated from the outlet orifice 2 in the direction of the discharge silencer were thus reduced. This reduction of volume causes certain low resonance frequencies to disappear corresponding to the backlash noise.

The present invention is not limited to the embodiments which have been more explicitly described, but includes the different variations and generalizations thereof contained within the scope of the following claims.

What is claimed is:

1. Exhaust outlet intended to form the end zone of an internal combustion engine exhaust line, comprising:
   an inlet orifice with means for connection to an exhaust gas conduction duct,
   an outlet orifice open to the free air for the discharge of exhaust gases,
   a collector tube conducting the exhaust gases from the inlet orifice to an intermediate expansion chamber,
   an outlet tube conducting exhaust gases to the outlet orifice,
   said intermediate expansion chamber comprising a first portion with a divergent wall adjacent the junction with the collector tube and being connected by a central zone to a second portion, with a convergent wall wherein:
   the central wall zone of the intermediate expansion chamber comprises at least one dust and liquid discharge orifice formed in its lower part, the dust and liquid discharge orifice communicating freely and permanently with the outside atmosphere, and wherein
   the outlet tube is adjacent the convergent wall of the intermediate expansion chamber and conducts the exhaust gases from the intermediate expansion chamber to the outlet orifice.

2. Exhaust outlet as claimed in claim 1, wherein the discharge orifice has a diameter between about 6 and 10 mm.

3. Exhaust outlet as claimed in claim 2, wherein:
   the divergent wall of the first portion of the intermediate expansion chamber forms a cone whose angle at the apex is between 70° and 100°,
   the convergent wall of the second portion of the intermediate expansion chamber forms a cone whose angle at the apex is between 70° and 100°.

4. Exhaust outlet as claimed in claim 3, wherein the collector tube has a smaller cross section than that of the outlet tube.

5. Exhaust outlet as claimed in claim 4, wherein the maximum cross section of the expansion chamber is at least 50% larger than the cross section of the collector tube.

6. Exhaust outlet as claimed in claim 1, wherein the wall of the first portion of the intermediate expansion chamber is connected to the wall of the second portion of the intermediate expansion chamber along a central zone with a rounded profile.

7. Exhaust outlet intended to form the end zone of an internal combustion engine exhaust line, comprising:
   an inlet orifice with means for connection to an exhaust gas conduction duct,
   an outlet orifice open to the free air for the discharge of exhaust gases,
   a collector tube conducting the exhaust gases from the inlet orifice to an intermediate expansion chamber,
   an outlet tube conducting exhaust gases to the outlet orifice,
   said intermediate expansion chamber comprising a first portion with a divergent wall adjacent the junction with the collector tube and being connected by a central zone to a second portion, with a convergent wall wherein:
   the central wall zone of the intermediate expansion chamber comprises at least one dust and liquid discharge orifice formed in its lower part,
   the outlet tube is adjacent the convergent wall of the intermediate expansion chamber and conducts the exhaust gases from the intermediate expansion chamber to the outlet orifice, and wherein
   the outlet tube is substantially cylindrical and ends in a rounded flange bent back outwards.

8. Exhaust outlet as claimed in claim 1, wherein the outlet tube comprises apertures spaced apart about the periphery of its wall, associated with an air intake for the intake of outside air through the apertures in the direction of the inside of the outlet tube.

9. Exhaust outlet as claimed in claim 8, wherein it comprises an outer casing covering wholly the lateral faces of the collector tube, of the intermediate expansion chamber and of the outlet tube.

10. Exhaust outlet as claimed in claim 9, wherein the periphery of the outlet flange forming the outlet orifice is non jointing with the end edge of the outer casing, defining an annular air intake passage.

11. Exhaust outlet as claimed in claim 10, wherein the lower wall of the outer casing is divergent, for facilitating discharge of the dust and liquids coming from the intermediate expansion chamber and passing through the discharge orifice.

12. Exhaust outlet as claimed in claim 1, wherein the collector tube is cylindrical.

13. Exhaust outlet as claimed in claim 1, wherein the collector tube comprises a narrowed zone in the form of a Venturi, defined by an upstream convergent wall with open angle connected to a downstream divergent wall with a more reduced angle.

* * * * *